July 6, 1926.
J. C. S. REEVES
1,591,142
PROCESS OF PRESERVING MILK
Filed Jan. 9, 1924
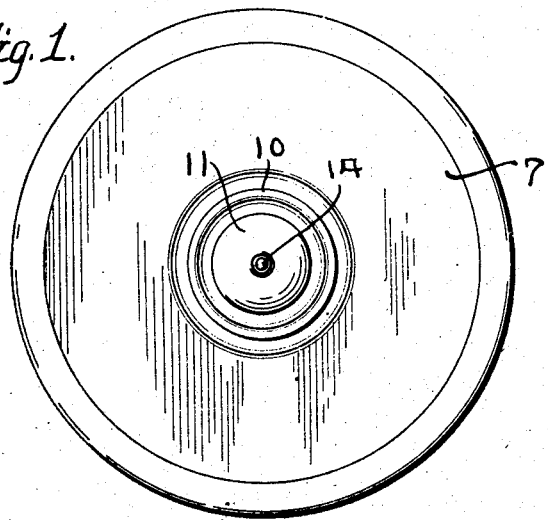
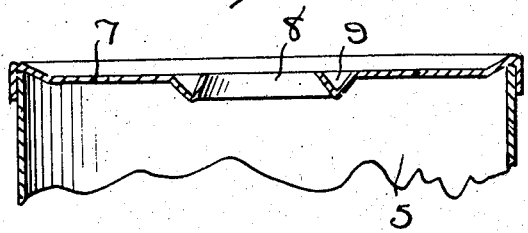
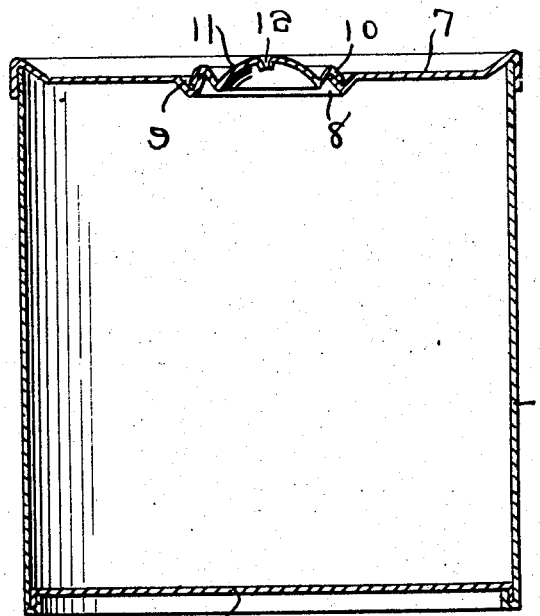
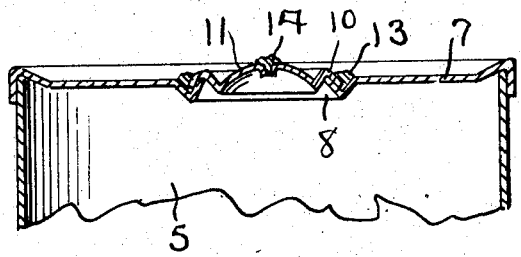
J. C. S. Reeves
INVENTOR.
BY Marks & Clerk
ATTORNEYS.

Patented July 6, 1926.

1,591,142

UNITED STATES PATENT OFFICE.

JORGE C. SERVETTI REEVES, OF BUENOS AIRES, ARGENTINA.

PROCESS OF PRESERVING MILK.

Application filed January 9, 1924, Serial No. 685,262, and in Uruguay Republic August 21, 1923.

During a long time I have been doing experiments by various methods, endeavouring to conserve the natural cows' milk without it being necessary to add any substance to it to maintain its conservation during months and even years inside the cans, remaining inalterable in spite of the conditions of the climate of the country in which it is stored, warm or cold, varying regularly by the change of seasons, or irregularly in any season.

The object of my effort was to resolve a problem which I have considered and still consider of the utmost importance in cattle-raising, as it relates to the conservation of milk and the possibility of getting this to become an export article, as its consumption in the world is imperiously demanded by children, and many countries do not, and will never be able to possess the sufficient cattle for their milk supply.

As milk is a product very easily altered and rapidly decomposed, it was not possible to me to anticipate any judgment on the efficiency of any of the processes which I had tested, till the present, when after long practice and storage and analysis of the tinned milk, I can affirm that success has crowned my effort, in every sense.

I have not wished to give a process to society without being perfectly convinced of its efficiency and practicability, but at present, having adopted a definite process to conserve milk, which satisfies all my endeavours, as it concerns itself with all the characteristics of fresh milk for months and even years, I find myself enabled to declare to society as I declare by the present memory, with every detail and in compensation of the invention patent which I claim, a proved and industrially practical method for the conservation of milk in its natural state for a practically indefinite length of time.

In the accompanying drawing wherein I have illustrated a metallic can specially devised for carrying out the improved process, Fig. 1 is a top plan view of the can.

Figs. 2, 3 and 4 are sectional views thereof showing the different steps incident to the closing of the can and sealing of the contents thereof.

Referring to the drawings in detail the body of the can is indicated at 5 and is provided with a closed bottom 6 and a top 7 having an opening 8 therein of sufficient size to permit the can to be readily filled with milk. The opening 8 is circular and the edge thereof is provided with an annular depression 9 for receiving the downwardly turned edge 10 of the cover or closure 11. At its center, the cover 11 is provided with a capillary opening 12.

To carry out my invention the following process must be followed.

When the milk arrives, it is analyzed so as to verify if it is in perfect condition to serve as a food, then it is carefully filtered; a can 5 is filled with milk almost to the top; the cover 11 is immediately placed on the top 7, so that the lapel 10 of the cover 11 will enter into the depression or rabbet around 9 the hole of the cover and the lapel is soldered in all its contour as indicated at 13, procuring a perfectly hermetical soldering.

After the cans have been filled as it has been described, they are placed in a water-bath in which lime chloride has been dissolved, warmed by steam winding pipes or by the direct action of hearth flames, the water of the bath reaching a little higher than the two thirds of the height of the cans; they remain there a few minutes, and when the milk appears through the capillary hole 12 of the cover, said hole 12 is hermetically obturated by a drop of tin 14; the cans are then tilted on one side in the water-bath where they must remain in their hermetically shut condition for ten minutes, at a temperature of 130° to 140° (centigrade), after which the cans are taken out of the bath and are rapidly cooled by some convenient refrigerating system; after this they may be stored, the operation being then finished and the conservation of the milk for an unlimited length of time, being ensured.

Having thus described the nature of my invention and the way to carry it out practically, I declare that I claim as my exclusive invention and right:

1. A process for the preservation of milk in containers having a filling opening therein, consisting in introducing milk through the filling opening, partially closing the filling opening whereby to reduce the size thereof, partially submerging the containers in a water bath, heating the bath until the milk is visible in the reduced opening, hermetically sealing said opening, continuing the heating of the containers in the bath at a sterilizing temperature for a period subsequent to the sealing of the opening, and removing and rapidly cooling the containers.

2. A process for the preservation of milk in containers having filling openings therein consisting in introducing the milk through the filling opening, restricting the size of the opening to provide a capillary orifice, partially submerging the container in a water bath, heating the bath until the milk is visible in the capillary orifice, applying a sealing medium to the capillary orifice to hermetically seal the container, continuing the heating of the container in the bath at a sterilizing temperature, and removing and cooling the containers.

In testimony whereof I affix my signature.

JORGE C. SERVETTI REEVES.